United States Patent [19]
Tokumoto

[11] Patent Number: 6,123,813
[45] Date of Patent: Sep. 26, 2000

[54] ELECTROSTATIC TREATING APPARATUS

[76] Inventor: Toshiyuki Tokumoto, 5-5-1004, Shimoshinjyo 3-chome, Higashiyodogawa-ku, Osaka, Japan

[21] Appl. No.: 09/324,444

[22] Filed: Jun. 2, 1999

[30] Foreign Application Priority Data

Jun. 2, 1998 [JP] Japan .................................. 10-170692
Jul. 13, 1998 [JP] Japan .................................. 10-196413

[51] Int. Cl.$^7$ .................................................. H05F 3/00
[52] U.S. Cl. .......................... 204/164; 204/570; 204/666; 204/672; 422/186.04
[58] Field of Search ......................... 422/186.04, 186.21; 204/164, 165, 168, 570, 571, 666, 672; 205/742

[56] References Cited

U.S. PATENT DOCUMENTS 3,412,003 11/1968 Tokumoto .
3,891,537  6/1975 Tokumoto .
5,256,270 10/1993 Tokumoto .

FOREIGN PATENT DOCUMENTS

0488651 A1  6/1992  European Pat. Off. .
60031810    2/1985  Japan .
4-200660    7/1992  Japan .
7-213948    7/1995  Japan .

OTHER PUBLICATIONS

Database WPI, Section Ch, Week 9733, Derwent Publications ltd., London, GB; Class D15, AN 95–316156, XP002114961 & JP 02 631082 B (Tokumoto T), Jul. 16, 1997 (07–16–1997), Abstract.

Primary Examiner—Kathryn Gorgos
Assistant Examiner—Wesley A. Nicolas
Attorney, Agent, or Firm—Kirschstein et al.

[57] ABSTRACT

An electrostatic treating apparatus comprises a tank 1 containing an insulating solvent A in which a pair of electrodes 4 is arranged and a liquid 2 is introduced from an inlet 3 and electrostatically treated. A guide plate for guiding treated water to the upper side of a pocket 7 is provided at the lower part of the aqueous layer B formed above the upper edge of the inner wall 5 of the pocket 7 and plural baffle plates 18 having openings at the upper part and the lower part alternately are equipped vertically at given intervals between the guide plate 8 and the lid of the tank 1, and an adsorbing agent vessel 19 can be equipped between the baffle plates 18. The treated water which goes up from an opening 9 between the outer side wall 6 of the pocket 7 and the guide plate 8 is passed through the adsorbing agent vessel 19 to be introduced to a discharge outlet 12. Further the electrodes 4 and the main parts of the guide plate 8 are hung and fixed to the lid D of the tank 1 so that they can be equipped to the tank 1 together with the lid D.

5 Claims, 2 Drawing Sheets

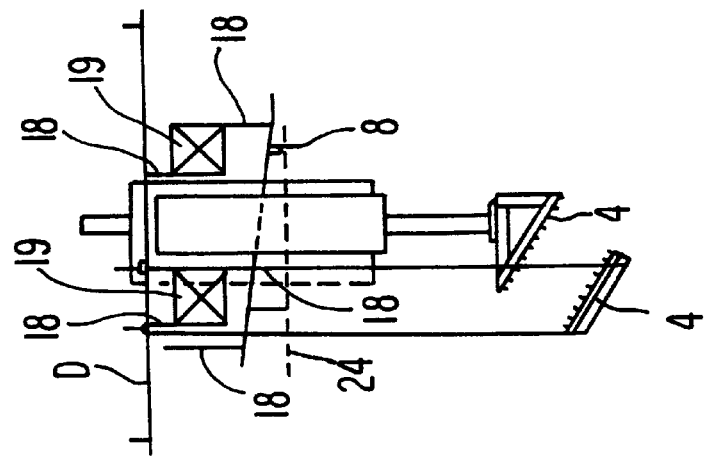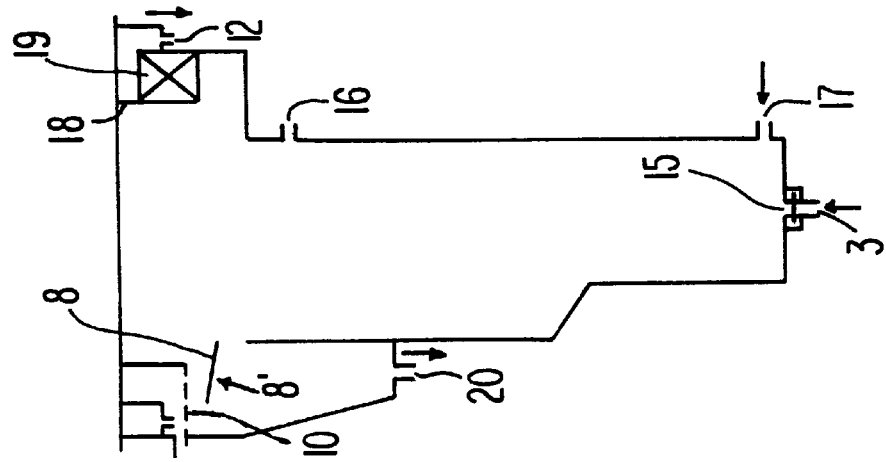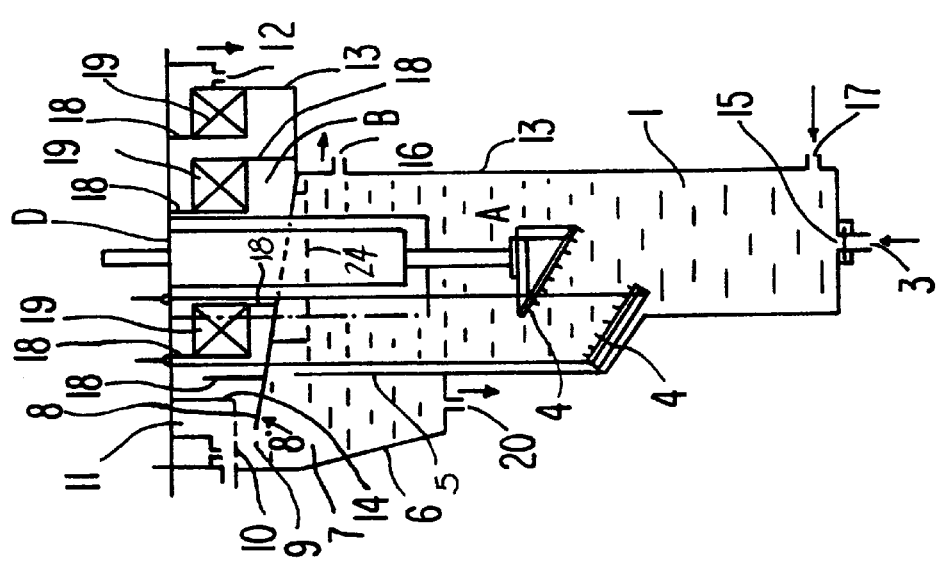

ELECTROSTATIC TREATING APPARATUS

BACKGROUND OF THE INVENTION

This invention relates to an improvement in an electrostatic treating apparatus which can treat an alkaline detergent solution and so efficiently.

The present inventor has developed a series of electrostatic separating apparatuses by utilizing electrostatic field in an electrically insulating solvent as effectively used for the treatment of water contaminated by a solvent and the like (See JP-B 40-15549, JP-B 51-3941, JP-B 51-3942, JP-B 51-23742, JP-B 01-22821 and JP-B 05-83306) and these apparatuses could separate and remove efficiently a small amount of oil contained in the water to be treated.

However, an alkaline detergent solution used for washing and removing oil and metal powder adhered to the ground, cut or pressed works has oil-emulsifying activity based on a surface active agent as a phase of detergency and therefore the contaminations such as oil and sludge washed off from the works are made to be present in emulsified state in the washings and the regeneration of contaminated washings was very difficult.

Thus, the present inventor developed an apparatus shown in Japanese Patent Specification No. 2631082 as a treating apparatus which can separate even the above-mentioned alkaline detergent solution efficiently into oil and water by utilizing the principle of said electrostatic separating apparatus with no wasteful consumption of surface active agent during use.

Treatment of a very wide range of dirty water and waste liquid came to be possible by using such an electrostatic separating apparatus that is an electrostatic treating apparatus. However, the shape of the treating apparatus was limited to carry out oil/water separation completely by using high voltage and also in a solvent layer and its assembling required skill and labor.

An object of the present invention is to provide an electrostatic treating apparatus which can be easily assembled and can remove efficiently some ppm of organic substances and trace of fine particulate suspended substances which have been difficult to be removed completely in a conventional apparatus.

SUMMARY OF THE INVENTION

According to the invention, the above-mentioned problems are solved by an apparatus in which a pair of electrodes is arranged in an insulating solvent A contained in a tank provided with an inlet for a liquid to be treated at the bottom and a direct current high voltage is applied between the electrodes and one side wall of the tank is made to be a double wall to form a pocket between its inner wall and its outer wall and the upper edge of the inner wall is positioned above the liquid surface of said solvent A so that the suspended impurity of sludge layer formed on the upper surface of the solvent A overflows to the pocket from the upper edge of said inner wall and said pair of electrodes is arranged asymmetrically with respect to the vertical axis of the tank and inclined upward at an angle of 25 to 40° against horizontal plane and said pocket is provided to be positioned at the side where the upper edge of said electrodes is present, and a guide plate for guiding treated water to the upper side of the pocket is provided at the lower part of the aqueous layer B formed above the upper edge of the inner wall of said pocket and a porous rectifying plate is provided substantially horizontally so as to cover an opening between said guide plate and said outer wall above the upper edge of said guide plate and and a floated sludge separating chamber open to the bottom is provided above said porous rectifying plate, and a discharge outlet for treated water is provided on the wall facing to said pocket of the tank so as to be positioned above the lower end of the inner wall of said floated sludge separating chamber, and a water rectifier is fixed to said inlet for the liquid to be treated, and a solvent outlet is provided on the wall facing to said pocket of the tank so as to be positioned above the upper end of said electrode and below the lower end of said guide plate, and a solvent inlet is provided on the wall facing to said pocket of the tank near the bottom and a precipitated sludge outlet is provided to the bottom of said pocket, and said guide plate is inclined so that its side wall side facing to said pocket is made to be the lower end and its pocket side is made to be the upper end to form an opening between the outer side wall of the pocket and the guide plate but is formed so that the other portion divides the aqueous layer B in the tank into two layers, and plural baffle plates having openings at the upper part and the lower part alternately are equipped vertically at given intervals between said guide plate and the lid of the tank and an adsorbing agent vessel through which water is passed vertically can be equipped between the baffle plates, and said electrode and the main parts of said guide plate are hung and fixed to the lid D of the tank so that they can be equipped to the tank together with the lid D.

Thus, in the invention, the guide plate for treated water is inclined to make the pocket side to be upper end to form an opening between the outer side wall of the pocket and the guide plate but is formed so that the other portion divides the aqueous layer B in the tank into two layers to guide all of the treated water rising in the tank efficiently above the pocket. Furthermore, plural baffle plates having openings at the upper part and the lower part alternately are equipped vertically at given intervals between the guide plate and the lid of the tank, and an adsorbing agent vessel through which water cbe passed is equipped between the baffle plates and thus some ppm of organic substances and trace of fine particulate suspended substances contained in the treated water can be efficiently removed during the time in which the treated water fed to the upper part of the pocket is passed between the baffle plates in a zigzag way and reaches the discharge outlet.

In an electrostatic treating apparatus, it is difficult and takes time to assemble large electrodes in the tank. In the apparatus of the invention, a large guide plate is provided above such electrodes and baffle plates are fixed on the guide plate and an adsorbing agent vessel is set between the baffle plates and then a lid is set on the tank. Therefore, when the apparatus is assembled according to the conventional method, it requires a very long time for the completion of the apparatus. Further it is required for the adsorbing agent to be exchanged after the apparatus was completed and used for a given period, and the attachment and detachment of the adsorbing agent vessel is difficult. However, in the invention, the electrodes and the main part of the guide plate (including the baffle plates and the adsorbing agent vessel) are hung and fixed to the lid D of the tank so that they can be equipped to the tank together with the lid D. Therefore, the electrodes and the guide plate can be assembled outside the tank and equipped to the tank together with the lid D and thus the apparatus can be assembled very efficiently. The adsorbing agent vessel can be also exchanged easily by lifting the lid D.

Next, in the invention, to carry out regeneration of the solvent continuously, it is preferred that a solvent purifying vessel C is equipped outside the tank and piping is set so that the contaminated solvent electrostatically treated and then discharged from the solvent outlet is purified by passing it through the solvent purifying vessel C and the purified solvent is fed again to the tank from the solvent inlet. The piping for guiding the contaminated solvent from the solvent outlet to the solvent purifying vessel C has substantially a shape of turned U and the height h of its upper end from the tank bottom is made to be [(height of the aqueous layer B in the tank×specific gravity of the aqueous layer)+(height of the solvent A in the tank×specific gravity of the solvent)]÷2 and a deaerating valve is provided at its upper end. Thus, the solvent can be regenerated automatically and continuously.

The solvent purifying vessel C is provided to remove the contaminant contained in the contaminated solvent because the solvent layer in the tank contains fatty acids and sulfur compounds and so in the organic substances extracted and dissolved by the electrostatic treating method with high voltage. An adsorbing agent such as activated clay and granular activated carbon is filled in the solvent purifying vessel C. The contaminated solvent overflowing the solvent outlet of the tank passes through the solvent purifying vessel C by always-circulating system and is purified and returned continuously to the solvent layer. As mentioned above, by specifying the height of the piping for feeding the solvent from the solvent outlet to the solvent purifying vessel C, admixture of the solvent with floating moisture and outflow of the mixture can be avoided and the boundary line of the solvent A layer and the aqueous layer B in the tank is not fluctuated and thus the solvent can be always purified stably and can be used by being introduced from the solvent inlet provided at the lower wall surface of the tank into the tank.

As an example for the use of the apparatus according to the invention, a separation solvent satisfying the following conditions is used:

1) It is neither inflammable nor explosive.
2) It has a permittivity of 2.0 to 7.0 (at 20° C.).
3) It has a specific gravity of not less than 1.30 (at 20° C).
4) It has a KB value (a measure showing solubility of kauri gum) of not less than 90.
5) It has a melting point of not higher than 0° C.

Further, a negative high direct current voltage of about 60 KV is preferably applied between the electrodes.

In the apparatus of the invention, the liquid to be treated, which is introduced from the bottom of the tank, scatters shuttle-like between the electrodes by the action of electrostatic field and meanwhile the oil component contained in the liquid to be treated is dissolved in the solvent and the impurities such as solid components are separated from water and rise linearly between the electrodes together with water. As an inclined guide plate is present above them, the separated impurities, namely sludge and water, are led above the pocket along the guide plate, and the sludge overflowed from the inner wall to the pocket and flowed down is removed from the precipitated sludge outlet formed at the bottom of the pocket. The sludge floated upward goes up from the end of the guide plate and is led to the floated sludge separating chamber positioned above it.

Therefore, from the outlet for treated water formed at the upper end of the wall facing to the pocket, water in which oil-component and sludge have been substantially removed (that is regenerated detergent solution) is discharged efficiently. At this time, as described above, in the apparatus of the invention, the regenerated detergent solution passes in a zigzag way upward and downward through plural baffle plates provided on the guide plate dividing the aqueous layer B vertically in two, and trace amounts of organic substances and fine particulate suspended materials are adsorbed and removed in the adsorbent vessel provided between them and then the regenerated detergent solution is led to the water outlet and therefore it is flowed out from the water outlet in purer condition than ever. It is preferred that porous adsorbents such as granular active carbon, glass wool and fine ceramics are filled in said adsorbent vessel.

In such an apparatus of the invention, after various contaminated liquids are fed into the tank from the inlet for the liquid to be treated and electrostatically treated, the solvent and the detergent solution can be circulated and used completely in a closed system. Therefore, a solvent such as tetrachloroethylene can be used with safety. Further, not only the oil from the liquid to be treated can be separated and regenerated, but also the water-soluble components such as a surface active agent can be also separated in a condition in which they are kept in the treated water as pure materials. Therefore, it can be regenerated highly efficiently for use.

By using an apparatus of the invention, for the special waste liquid which has been said difficult to separate water completely, a same solvent as the insulating solvent A used in the tank can be mixed previously with said waste liquid and the mixture can be fed to the tank as the liquid to be treated to separate almost completely water from said waste liquid.

For example, an oil/water mixture such as marine oil effluent—waste liquid which has been said impossible to be separated completely into oil and water as it contains oil balls including water and non-fluid oil—is mixed previously with an insulating solvent A to give a fluid solution (liquid to be treated) and it is fed to the tank to make an efficient continuous electrostatic treatment possible. As the solvent A is recovered together with oil, the amount added is not particularly restricted and it is sufficient to be about 1 to 5% based on the oil/water mixture.

A waste liquid contaminated by a water-soluble solvent such as an alcohol is difficult to be completely separated into the alcohol and water due to hydrophilicity of the alcohol, when it is introduced to the tank as it is. However, when an insulating solvent A is mixed previously with said waste liquid to form a complex between the alcohol and the solvent A and then said mixed liquid is introduced to the tank as the liquid to be treated, the alcohol can be separated completely from water. In this case, the amount of the solvent A added to the waste liquid is preferably not less than the amount of the water-soluble solvent such as an alcohol contained in the waste liquid and the higher the better. The solvent A mixed to the waste liquid can be completely recovered and reused as mentioned above.

BRIEF DESCRIPTION OF THE DRAWINGS

In an apparatus of the invention,

FIG. 1a is a total view of the apparatus,

FIG. 1b is a view of the apparatus without the lid D, and

FIG. 1c is a view of the lid D portion.

PREFERRED EMBODIMENTS OF THE INVENTION

Figure 2:
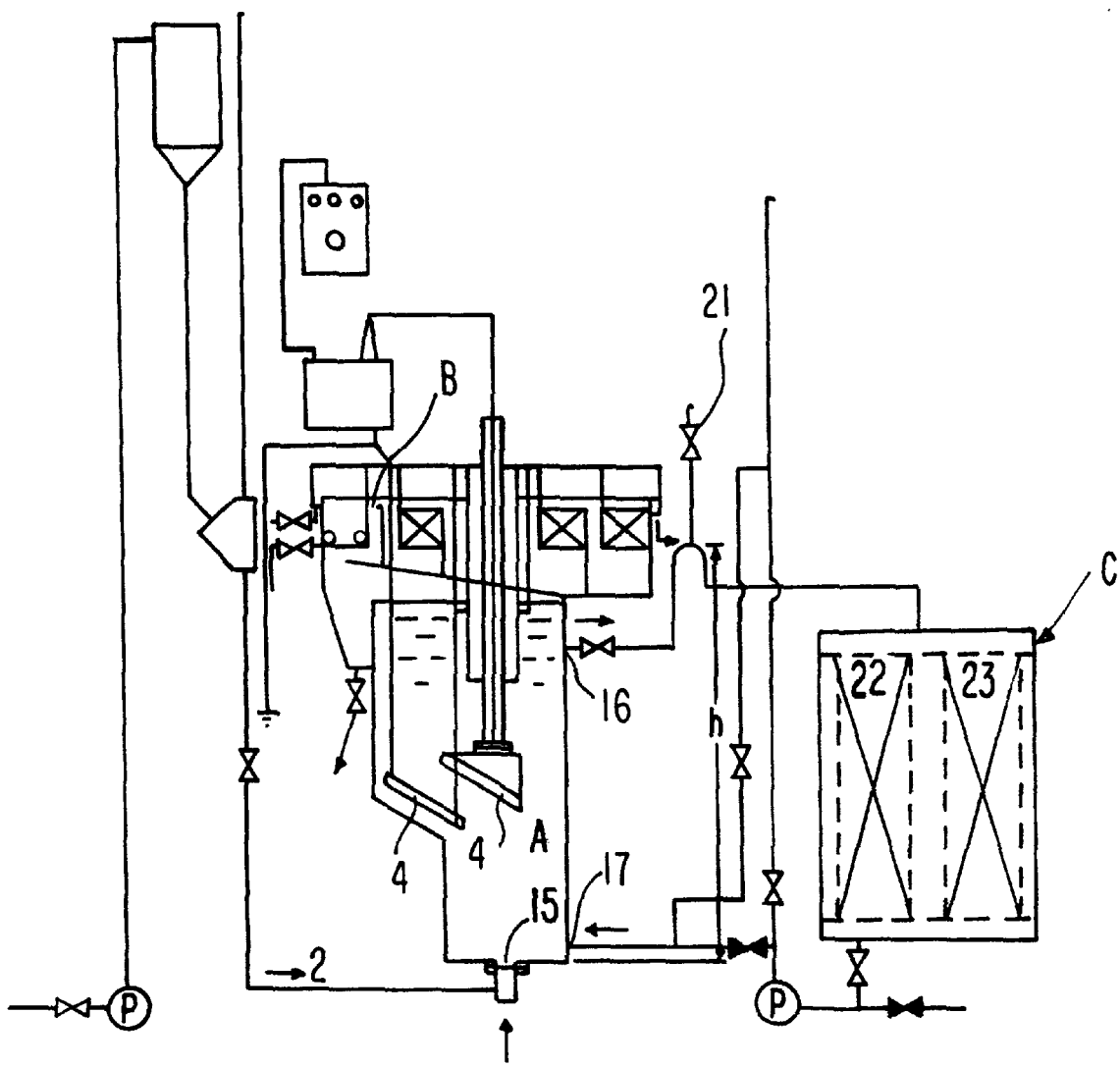
FIG. 2 is a diagram including the solvent purifying vessel in an example of the invention.

In an apparatus illustrated in the drawings, a liquid 2 to be treated is led to the inlet 3 of the bottom of tank 1 and electrostatically treated in the tank 1. An insulating solvent A is contained in the tank 1 and a pair of electrodes 4 is arranged in the solvent A and a high direct current voltage is applied between the electrodes 4.

The electrodes 4 are present aside to one side of the tank 1 and inclined upward at an angle of about 30° against horizontal plane. The side wall of the tank at the side where the upper edge of said electrodes 4 is present is made to be a double wall and a pocket 7 is formed between the inner wall 5 and the outer wall 6.

A guide plate 8 for guiding treated water above the pocket 7 is provided at the lower part of the aqueous layer B which is formed above the upper edge of the inner wall 5 of the pocket 7. A porous rectifying plate 10 is provided substantially horizontally so as to cover the opening 9 between the guide plate 8 and the outer wall 6 above the upper end of the guide plate 8. A floated sludge separating chamber 11 which is open to the bottom is provided above the porous rectifying plate 10.

Furthermore, a discharge outlet 12 for treated water is provided on the wall 13 facing to the pocket 7 of the tank 1 so as to be positioned above the lower end of the inner wall 14 of the floated sludge separating chamber 11, and a water rectifier 15 is fixed to the inlet 3 for the liquid to be treated, and a solvent outlet 16 is formed on the wall 13 facing to the pocket 7 of the tank 1 so as to be positioned above the upper end of the electrode 4 and below the lower end of the guide plate 8 and a solvent inlet 17 is formed on the wall 13 facing to the pocket 7 of the tank 1 near the bottom and a precipitated sludge outlet 20 is formed to the bottom face of the pocket 7.

The apparatus is characterized in that, as shown in FIGS. 1b and 1c, the electrodes 4 and the main part of the guide plate 8 for the treated water can be previously set up to the lid D outside the tank 1 and then attached to the tank 1. The guide plate 8 is inclined so that the upper end is positioned at the pocket side and the lower end is positioned at the side wall side facing to the pocket 7 and an opening 9 is formed between the outer side wall 6 of the pocket 7 and the upper end but the other portion divides the aqueous layer B in the tank 1 into two layers. In the tank 1, the end of the main portion of the guide plate 8 hung on the lid D is made to be fixed on the end 8' of the guide plate 8 equipped in the tank 1 to be positioned above the pocket 7.

Furthermore, plural baffle plates 18 having openings at the upper part and the lower part alternately are equipped vertically at given intervals between the guide plate 8 and the lid of the tank 1, and an adsorbing agent vessel 19 through which water can be vertically passed may be equipped between the baffle plates 18. In this example, the final baffle plate 18 positioned at the side of the discharge outlet 12 is fixed to the tank 1 and the third adsorbing agent vessel 19 is made to be able to be equipped between the baffle plate 18 and the wall 13.

Five baffle plates 18 are fixed to the lid D and the main part of the guide plate 8 attached to the lid D, and two adsorbing agent vessels 19 are made to be able to be set between these baffle plates 18.

As the electrodes 4, the main part of the guide plate 8 and a part of the baffle plates 18 are set up to the lid D outside the tank 1 as shown in FIG. 1c and then fixed to the tank 1 shown in FIG. 1b, such an apparatus can be assembled very efficiently. As the essential parts are not fixed by welding and so and constitute units, they can be disjointed and reassembled if required.

In the apparatus of a porous rectifying plate 24 is also provided at the upper portion of the solvent A. The porous rectifying plate 24 is hung to the guide plate 8 and can be set in the tank 1 together with the lid D.

Next, in the apparatus of the invention, to purify the solvent A and circulate it continuously for use, it is preferred as shown in FIG. 2 that a solvent purifying vessel C is provided outside the tank 1 and piping is set so that the contaminated solvent which is electrostatically treated and then discharged from the solvent outlet 16 is purified by passing through the solvent regenerating vessel C and the purified solvent is introduced again to the tank 1 from the solvent inlet 17. Here, it is preferred that the piping leading the contaminated solvent from the solvent outlet 16 to the solvent purifying vessel C is made to have substantially a shape of turned U and the height h of its upper end from the tank bottom is made to be [(height of the aqueous layer B in the tank×specific gravity of the aqueous layer)+(height of the solvent A in the tank×specific gravity of the solvent A)]÷2 and a deaerating valve 21 is provided at its upper end.

By using such piping, floating moisture and the like are not mixed with the solvent and do not flow out, and the boundary line between the solvent A layer and the aqueous layer B in the tank is maintained constant and thus the solvent can be continuously purified always stably and introduced to the tank again from the solvent inlet for use.

In the example of FIG. 2, the solvent purifying vessel C has two adsorption filters 22, 23 and the solvent passes through the filters 22, 23 successively to be purified. The filter 22 is filled with active clay, while the filter 23 is filled with granular active carbon. In this example, as mentioned above, as the solvent can be introduced to the solvent purifying vessel C in moisture-free condition, active clay can be used and therefore fatty acids contained in the solvent can be removed efficiently. Active carbon can remove sulfur compounds.

As mentioned above, the apparatus of the invention as shown in the drawings can be used very effectively also for the treatment of waste liquid consisting of oil/water mixture and waste liquid containing water-soluble solvent. In these treatments, it is preferred a solvent same as the solvent A in the tank is mixed with the waste liquid to prepare a liquid 2 to be treated and it is fed to the tank 1 from the inlet 3 and continuously electrostatically treated.

Furthermore, as the apparatus of the invention is equipped with a guide plate 8 for treated water, it can be used very effectively for the treatment of waste liquid containing gas dissolved in it, such as underground water containing chlorine gas, without contamination of the treated water with the gas. For example, in such a waste liquid treatment, there is such a danger that part of the solvent A adheres to bubbles, rises and contaminates the treated water layer portion in the process wherein the gaseous substance separated and degassed in the electrostatic field floats to the surface of the aqueous layer due to specific gravity difference. However, all of floated bubbles are led into the floated sludge separating chamber 11 and cannot flow into the purification process of the electrostatically treated water.

The apparatus according to the invention as described above has the following advantages.

The apparatus of the invention can be prepared very efficiently, because the electrodes 4 having a complicated structure can be set to the lid D outside the tank 1. Further, the essential parts are constituted in units and fixed by bolt-nut or assembly but not fixed by welding and the like, and therefore the apparatus can be disjointed and reassembled easily if required and the adsorbing agent vessel in the aqueous layer B can be frequently exchanged.

Also, the solvent can be purified always stably and circulated for use by carrying out the piping from the solvent outlet to the solvent purifying vessel C by a specific system.

Further, the apparatus of the invention can treat waste liquid consisting of oil/water mixture and waste liquid containing water-soluble solvent such as an alcohol by mixing a solvent same as the solvent A in the tank 1 previously to the waste liquid to give a liquid to be treated.

What is claimed is:

1. An electrostatic treating apparatus in which a pair of electrodes 4 is arranged in an insulating solvent A contained in a tank 1 provided with an inlet 3 for a liquid 2 to be treated at the bottom and a direct current high voltage is applied between the electrodes 4 and one side wall of the tank 1 is made to be a double wall to form a pocket 7 between its inner wall 5 and its outer wall 6 and an upper edge of the inner wall 5 is positioned above the liquid surface of said solvent A so that the suspended impurity of sludge layer formed on the upper surface of the solvent A overflows to the pocket 7 from the upper edge of said inner wall 5 and said pair of electrodes 4 is arranged asymmetrically with respect to a vertical axis of the tank 1 and inclined upward at an angle of 25 to 40° relative to a horizontal plane and said pocket 7 is provided to be positioned at a side where the upper edge of said electrodes 4 is present, and a guide plate 8 for guiding treated water to the upper side of the pocket 7 is provided at the lower part of an aqueous layer B formed above the upper edge of the inner wall 5 of said pocket 7 and a porous rectifying plate 10 is provided substantially horizontally so as to cover an opening 9 between said guide plate 8 and said outer wall 6 above the upper edge of said guide plate 8 and a floated sludge separating chamber 11 open to the bottom is provided above said porous rectifying plate 10, and a discharge outlet 12 for treated water is provided on the wall 13 facing to said pocket 7 of the tank 1 so as to be positioned above the lower end of the inner wall 14 of said floated sludge separating chamber 11, and a water rectifier 15 is fixed to said inlet 3 for the liquid to be treated, and a solvent outlet 16 is provided on the wall 13 facing said pocket 7 of the tank 1 so as to be positioned above the upper end of said electrodes 4 and below the lower end of said guide plate 8 and a solvent inlet 17 is provided on the wall 13 facing said pocket 7 of the tank 1 near the bottom and a precipitated sludge outlet 20 is provided to the bottom of said pocket 7, characterized in that:

said guide plate 8 is inclined so that its side wall side facing said pocket 7 is made to be the lower end and its pocket 7 side is made to be the upper end to form an opening 9 between the outer side wall 6 of the pocket 7 and the guide plate 8 but is formed so that the other portion divides the aqueous layer B in the tank 1 into two layers, and plural baffle plates 18 having openings at the upper part and the lower part alternately are equipped vertically at given intervals between said guide plate 8 and a lid D of the tank 1, and an adsorbing agent vessel 19 for passing water vertically and being equipped between said baffle plates 18, and said electrodes 4 and the main parts of said guide plate 8 are hung and fixed to the lid D of the tank 1 for enabling said electrodes and the main parts of said guide plate to be equipped to the tank 1 together with the lid D.

2. An apparatus according to claim 1, in which a solvent purifying vessel C is equipped outside said tank 1 and a pipe arrangement is provided so that the contaminated solvent is electrostatically treated and then discharged from said solvent outlet 16 and is purified by passing it through the solvent purifying vessel C and the purified solvent is fed again to the tank 1 from the solvent inlet 17 and the pipe arrangement for guiding the contaminated solvent from said solvent outlet 16 to the solvent purifying vessel C has substantially a turned U-shape and the height h of its upper end from the tank bottom is made to be [(height of the aqueous layer B in the tank×specific gravity of the aqueous layer)+(height of the solvent A in the tank×specific gravity of the solvent A)]÷2 and a deaerating valve 21 is provided at its upper end.

3. A method for the treatment of waste liquid by using the apparatus according to claim 1, in which a same solvent as the solvent A in said tank 1 is added previously to the waste liquid and mixed together to give a liquid 2 to be treated and the liquid is fed to the inlet 3 of the tank 1 and electrostatically treated in said tank 1.

4. A method according to claim 3, in which said waste liquid is an oil/water mixture.

5. A method according to claim 3, in which said waste liquid contains a water-soluble solvent.

* * * * *